United States Patent

Gee

[15] 3,697,779
[45] Oct. 10, 1972

[54] FUNCTION CONTROL
[72] Inventor: Gordon E. Gee, Homewood, Ill.
[73] Assignee: Electro Corporation
[22] Filed: July 18, 1969
[21] Appl. No.: 842,847

[52] U.S. Cl. .................307/235, 307/215, 307/216, 318/601, 328/206
[51] Int. Cl. ............................................H03k 19/32
[58] Field of Search......307/235, 218, 289, 216, 215, 307/226; 318/601, 600; 324/191; 250/231, 219; 328/206

[56] References Cited

UNITED STATES PATENTS

| | | | |
|---|---|---|---|
| 3,115,583 | 12/1963 | Hinkein | 307/216 |
| 3,145,342 | 8/1964 | Hill | 307/218 |
| 3,196,358 | 7/1965 | Bagley | 307/218 |
| 3,283,255 | 11/1966 | Cogar | 307/218 |
| 3,291,973 | 12/1966 | Rasche | 307/216 |
| 3,183,365 | 5/1965 | Ligotky | 307/226 |
| 3,219,895 | 11/1965 | Price | 318/601 |
| 3,254,300 | 5/1966 | Prell | 324/191 |
| 3,502,893 | 3/1970 | Delp | 250/231 |

Primary Examiner—Rudolph V. Rolinec
Assistant Examiner—David M. Carter
Attorney—Hofgren, Wegner, Allen, Stellman & McCord

[57] ABSTRACT

A control circuit which responds to plural characteristics of an apparatus. When synchronism of the characteristics is lost for a period of time, a signal is given to turn the apparatus off.

7 Claims, 4 Drawing Figures

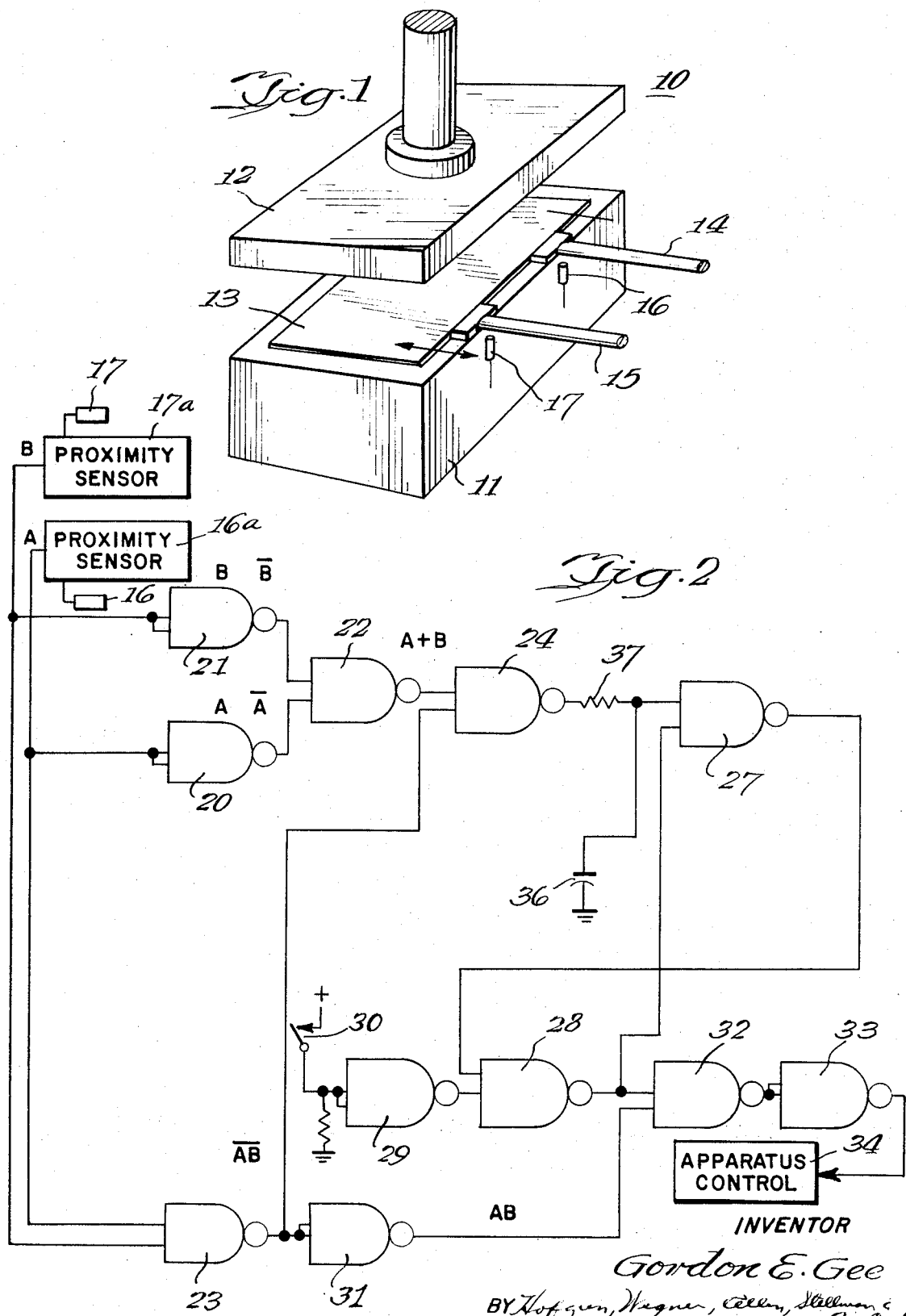

FUNCTION CONTROL

This invention is concerned with a control which is responsive to a plurality of characteristics of an automatic apparatus for generating a signal to stop the apparatus, or to give a warning to an operator when the monitored characteristics are not properly synchronized. For example, in a stamping machine, it is necessary that the operation of the machine be synchronized with the feed of work pieces into the machine and the removal of formed articles therefrom. If synchronism is lost and the press strikes an improperly positioned work piece or an extractor arm, expensive tooling may be damaged.

Various devices are known for sensing the presence (or absence) of machine elements, raw material, piece parts and processed (or partially processed) articles. This invention is concerned with a digital function control responsive sensing devices which monitor various machine characteristics, as machine element position or work piece movement, to provide for interruption of power to the machine (or a warning signal) in the absence of a desired time relationship of occurrence of the various characteristics.

A principal feature of the invention is that the control includes a means for sensing the condition of each of plural characteristics of the apparatus, means for comparing the conditions of the characteristics and means responsive to a difference in condition among the characteristics for generating a control signal. More particularly, the control comparing means includes a gate circuit, the output of which is connected with a bistable flip-flop network which generates the control signal and maintains it until manually reset. A time delay circuit is preferably connected between the gate circuit and the bistable flip-flop to accommodate short differences in the time of occurrence of apparatus characteristics.

Another feature is that the control for monitoring two characteristics of an apparatus includes an EXCLUSIVE-OR circuit responsive to one of the conditions of each characteristic.

A further feature is that the control includes means for generating signals representing one condition of each characteristic, AND means responsive to the signals representing the one condition and a means responsive to the AND means for generating the control signal.

Yet another feature is that the control includes a means responsive to the sensing means for generating signals representing both conditions of each characteristic, two AND means, one responsive to the signals representing each condition of the characteristics, and means responsive to both said AND means for generating the control signal.

Further features and advantages of the invention will readily be apparent from the following specification and from the drawings, in which:

FIG. 1 is a diagram of an apparatus utilizing a two characteristic function control;

FIG. 2 is a circuit diagram of the function control for the apparatus of FIG. 1;

Figure 4:
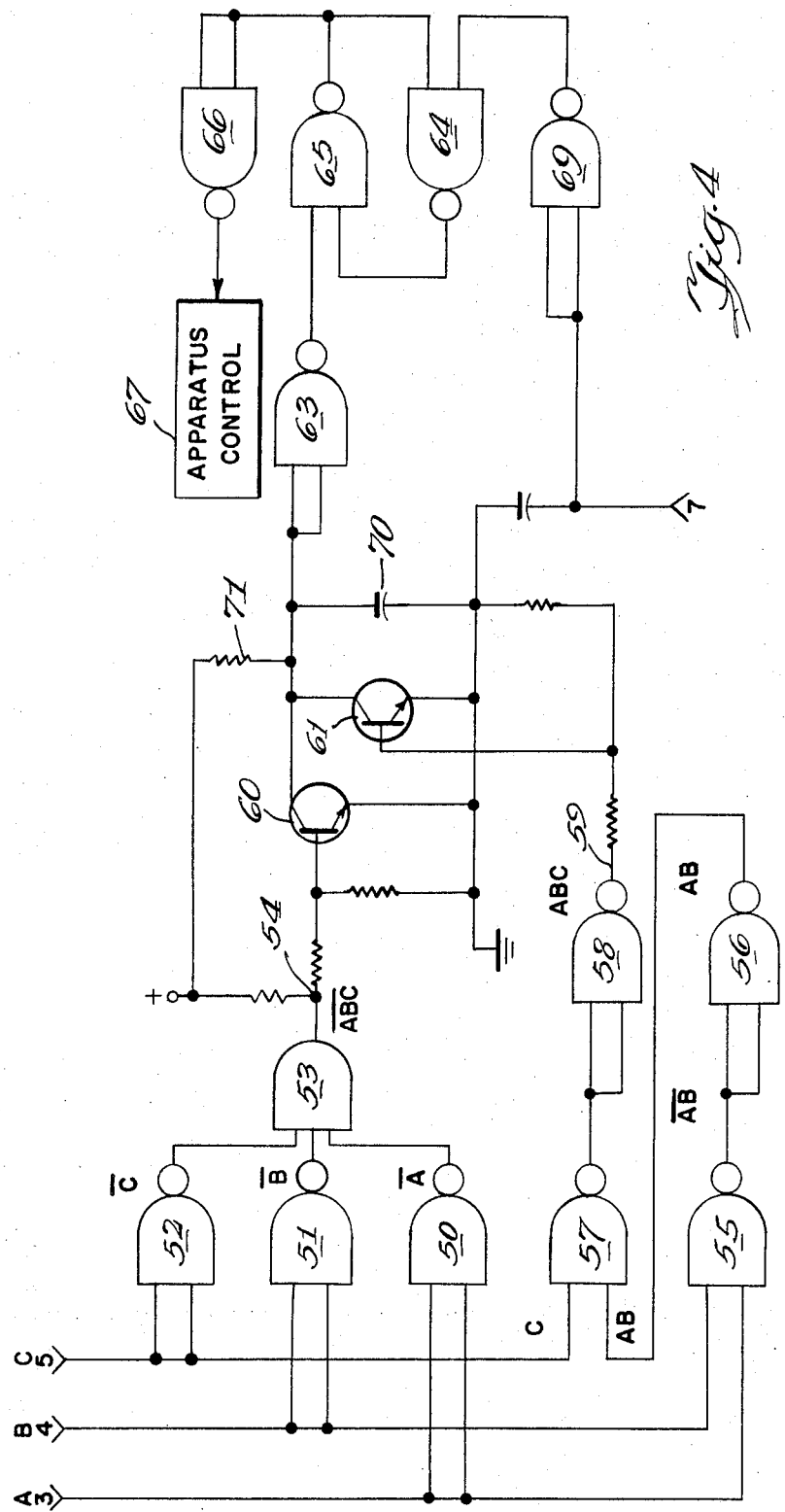
FIG. 4 is a circuit diagram of a control for the apparatus of FIG. 3.

Two embodiments of the invention are illustrated herein to indicate the versatility of the digital function control system in monitoring various apparatus characteristics. The apparatus monitored, e.g., machine elements, tools, raw material, work pieces and partially or completely finished articles, are themselves no part of the invention and they are not illustrated in detail. Similarly, the characteristic sensing means may take many forms and are not shown in detail.

Turning to FIGS. 1 and 2 of the drawings, the apparatus controlled is a press 10 having a base 11 and a vertically reciprocating die or tool 12. The motive means for reciprocating tool 12 is not illustrated. A work piece 13 is moved into and out of press 10 by arms 14 and 15. In order to avoid damage to the press and to the arms, both arms must be retracted at the time the upper press plate 12 descends. In accordance with the invention, the position of the arms 14 and 15 is detected by proximity sensor pickups 16 and 17 and these characteristics of the apparatus provide inputs to the control.

Turning now to FIG. 2, proximity sensors 16 and 17 are connected with proximity sensor circuits 16a and 17a. During the course of the following description, the condition of arms 14 and 15 will be designated by the letters A and B which are here shown as inputs to a digital logic network. For the purposes of the discussion of the specific circuit, the outputs of proximity sensors 16a and 17a will be considered to have a logical 1 value when the arms are retracted and a logical 0 value when the arms are in the machine.

The circuit shown utilizes NAND gates which are connected to provide a variety of functions. This approach is preferably in practice from an economical standpoint. Obviously, other digital circuits might be substituted. The following description of the operation will be concerned primarily with the function of the system rather than the specific interconnections of the gates.

The A and B signals are coupled with a pair of NAND gates 20 and 21 operated as inverters, having outputs representing $\overline{A}$ and $\overline{B}$, respectively. These outputs are connected with NAND gate 22, the output of which is A or B (A+B). The A and B signals from the proximity sensors are also connected as inputs to NAND gate 23, the output of which is $\overline{AB}$. The A+B and $\overline{AB}$ signals are connected as inputs to NAND gate 24, the output of which is $\overline{(A+B)\ \overline{AB}}$. This represents the negative of an EXCLUSIVE-OR signal in AB. Thus, there is a 1 output from NAND gate 24 so long as A and B are synchronized. At any time either A or B, but not both, is present, the output is 0. Physically this represents a condition in the apparatus of FIG. 1 in which the work piece handling arms 14 and 15 do not move in synchronism. Thus, the NAND gates 20–24 provide a means for comparing the signals from the sensors. The output of NAND gate 24 is utilized in the generation of an output control signal.

NAND gates 27, 28 are interconnected to form a bistable flip-flop circuit. NAND gate inverter 29 normally has a 1 output but provides for reset of the flip-flop when its input is connected with a logical 1 voltage source through momentary contact switch 30. In normal operation, with the movement of arms 14 and 15 synchronized, the output of NAND gate 24 is 1. The output of NAND gate 27 is 0 and the output of NAND gate 28 is 1. So long as this condition is maintained, the apparatus will operate whenever AB is 1. The output of NAND gate 23 ($\overline{AB}$) is connected through inverter 31 having an AB output which together with the output of gate 28 are inputs to NAND gate 32. With two 1 inputs to NAND gate 32, it has a 0 output inverted by NAND gate 33 to provide a 1 output to apparatus control circuit 34.

In the event of a loss of synchronism between arms 14 and 15, the 1 output of NAND gate 24 changes to 0. A time delay circuit including shunt capacitor 36 and series resistor 37 connected between NAND gate 24 and NAND gate 27 maintains a 1 input to permit transient differences in arm position. After a delay, as one-half second, the charge on time delay capacitor 36 is dissipated through resistor 37. When the 1 input to NAND gate 27 changes to 0, its output goes to 1 causing the bistable circuit to assume a set position. The output of NAND gate 28 is then 0 and the apparatus control 34 is disabled regardless of the position of the arms. The bistable network is reset by providing a 1 input to NAND gate 29 which is inverted and applied to NAND gate 28, as a 0. The output of NAND gate 28 becomes 1 and, if the arms are again synchronized, NAND gate 27 has two 1 inputs and a 0 output.

Figure 3:
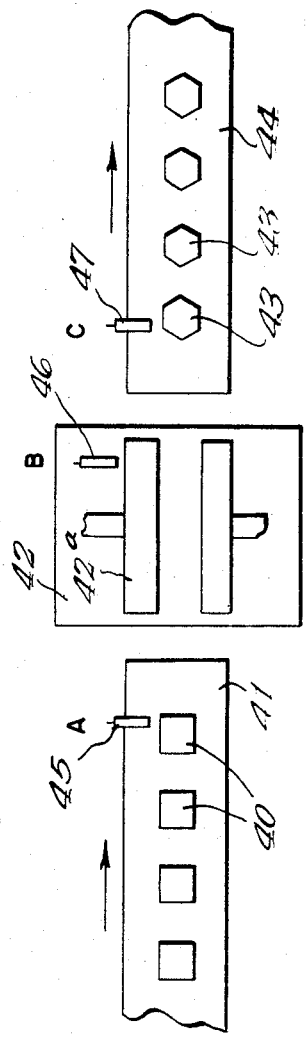
FIG. 3 is a diagram of an apparatus utilizing a three characteristic control.

In FIG. 3, an apparatus is illustrated in which it is desired to maintain synchronism at three points in a manufacturing apparatus. Here, work pieces or blanks 40 are delivered on a conveyor belt 41 to a machine 42. The work pieces 43 leave the machine in changed form, on a conveyor 44. Proximity sensors 45, 46 and 47 are located to respond respectively to incoming parts 40 on conveyor 41, an operating element 42a of the machine and outgoing parts 43 on conveyor 44. These characteristics of the apparatus are utilized as inputs to the control.

The three proximity pickup units 45, 46 and 47, together with proximity sensor circuits (not shown) provide the A, B and C inputs for the circuit of FIG. 4. The A, B and C signals are inverted by NAND gates 50, 51 and 52, respectively, and these signals are connected through AND gate 53 to provide an output signal at 54 representing $\overline{ABC}$. The A and B inputs are connected with NAND gate 55, the output of which is $\overline{AB}$. This signal is inverted in NAND gate 56 and the AB signal is an input, with the C signal, to NAND gate 57, the output of which is inverted by NAND gate 58 to provide an ABC signal at 59. So long as the monitored characteristics of the apparatus are in synchronism, there is a logical 1 output from either AND gate 53 or NAND gate 58.

A transistor switch 60 is connected with the output of AND gate 53 while transistor switch 61 is connected with the output of NAND gate 58. With a logical 1 output from one of the gates, the corresponding transistor conducts and there is a logical 0 at its collector, the input to inverter 63. The inverter 63 has a 1 output which is applied to one of the inputs of NAND gate 65 which together with NAND gate 64 forms a bistable flip-flop network analogous to that of NAND gates 27, 28 in FIG. 2. With synchronism maintained among the inputs, the output of NAND gate 65 is a logical 0 which is inverted by NAND gate 66 providing a 1 output to apparatus control 67.

NAND gate 69, connected as an inverter, normally has a 0 input and a 1 output which is connected to one of the inputs of flip-flop NAND gate 64.

Upon a loss of synchronism, neither of transistor switches 60, 61 conducts and time delay capacitor 70 charges through resistor 71. When the voltage at the input of inverter 63 reaches the level of a logical 1, the inverter has a 0 output which shifts the flip-flop 64, 65 so that NAND gate 65 has a 1 output and the apparatus control 67 is turned off. The system is restarted by applying a 0 input to inverter 69, yielding a 1 output which together with the 1 output of NAND gate 65 yields a 0 output from NAND gate 64 resetting the flip-flop network.

Although only three inputs are shown to the system of FIG. 4, more can be utilized depending upon the capabilities of the gates. Furthermore, the capacity of the system can further be expanded by using multiple pyramid connected gate networks to drive the transistor switches.

In both the systems of FIGS. 2 and 4, the output of the function control circuit has been illustrated as an electrical signal which operates a control for the apparatus itself. This direct control of the power source to the apparatus being monitored could be supplemented or replaced by a suitable warning device, depending on the nature of the apparatus and the possible damage which might result from operation with the monitored characteristics being out of synchronism.

I claim:

1. A control responsive to physical position characteristics of two moving elements being operated by at least a portion of an apparatus, each characteristic being capable of assuming one or the other of two conditions, said control comprising: means for sensing the position of each element for determining the condition of each characteristic of said elements; means responsive to said sensing means for comparing the conditions of each characteristic of said elements; and means responsive to a difference in condition among said characteristics for generating a warning signal, said comparing means including an EXCLUSIVE-OR circuit responsive to one of the conditions of each characteristic to actuate said warning signal generating means to inhibit operation of the apparatus in the absence of correspondence among the characteristics.

2. The control of claim 1 in which said means for generating warning signal includes AND means responsive to the output of said EXCLUSIVE-OR circuit and to one of the two conditions of the characteristics.

3. The control of claim 1 including time delay means connected between the output of said EXCLUSIVE-OR means and said warning signal generating means.

4. A control responsive to physical position characteristics of a plurality of moving elements being operated by at least a portion of an apparatus, each characteristic being capable of assuming one or the other of two conditions, said control comprising: means for sensing the position of each element for determining the condition of each characteristic of said elements; means responsive to said sensing means for comparing the conditions of each characteristic of said elements; means responsive to a difference in condition among said characteristics for generating a warning signal; means responsive to said sensing means for generating signals representing one condition of each characteristic; means responsive to said sensing means for generating signals representing the other condition of each characteristic; AND means responsive to the signals representing said one condition of said characteristics; AND means responsive to the signals representing the other condition of said characteristics; said means for generating a warning signal being responsive to both said AND means.

5. A control responsive to physical position characteristics of a plurality of moving elements being operated by at least a portion of an apparatus, each characteristic being capable of assuming one or the other of two conditions, said control comprising: means for sensing the position of each element for determining the condition of each characteristic of said elements; means responsive to said sensing means for comparing the conditions of each characteristic of said elements; means responsive to a difference in condition among said characteristics for generating a warning signal; means for generating signals representing one condition of each characteristic; AND means responsive to the signal representing said one condition; said means for generating a warning signal being responsive to said AND means; and time delay means connected between said AND means and said warning signal generating means, said time delay having a period sufficiently long that transient position characteristics of said elements will not result in the generation of said warning signal.

6. The control of claim 4 wherein each of said AND means includes a transistor switch and the means for generating the warning signal includes a bistable flip-flop network connected with the outputs of said transistors.

7. The control circuit of claim 6 including time delay means connected between said transistors and said warning signal generating means.

* * * * *